A. KRUGER.
STOCK FOUNTAIN.
APPLICATION FILED OCT. 1, 1915.
1,238,303.  Patented Aug. 28, 1917.
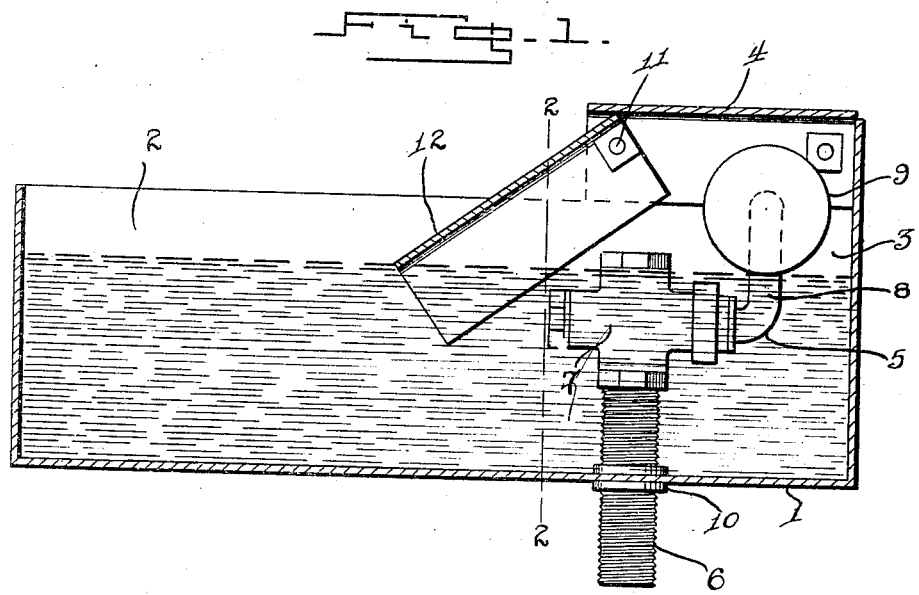
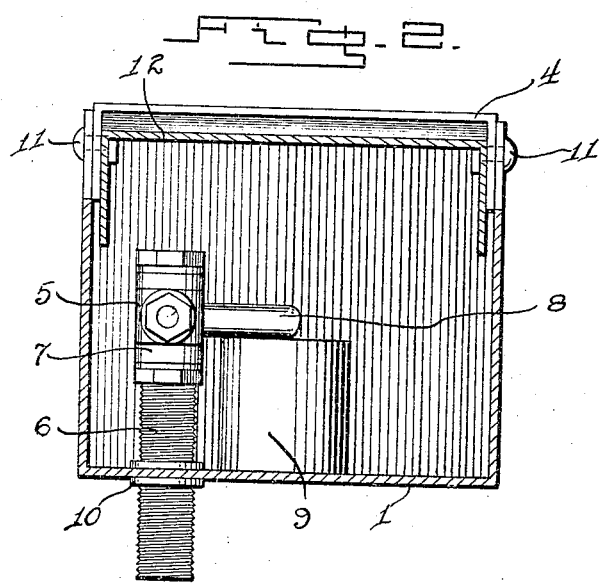
WITNESSES
Francis Ph. O'Reilly.
W. E. Valk Jr.
INVENTOR
Adolph Kruger,
BY Richard Owen.
ATTORNEY

UNITED STATES PATENT OFFICE.

ADOLPH KRUGER, OF ROCHESTER, MINNESOTA.

STOCK-FOUNTAIN.

1,238,303.  Specification of Letters Patent.  Patented Aug. 28, 1917.

Application filed October 1, 1915. Serial No. 53,606.

*To all whom it may concern:*

Be it known that I, ADOLPH KRUGER, citizen of the United States, residing at Rochester, in the county of Olmstead and State of Minnesota, have invented certain new and useful Improvements in Stock-Fountains, of which the following is a specification.

My invention relates to watering devices and appertains more particularly to an improved stock fountain of the type utilizing an automatic cut-off device.

An object of the invention is to provide and associate with a watering device of the character described an improved protector or shield for the live stock drinking therefrom.

A further object of the invention is to provide a novel and improved stock fountain that is light, simple, cheap, durable, portable and easily attached to a water supply pipe or tank.

A further object of the invention is to provide a stock fountain having a long low drinking space in front and a high covered float-chamber at the rear.

The above and additional objects are accomplished by such means as are illustrated in their preferred embodiment in the accompanying drawings, described in the following specification and then more particularly pointed out in the claim which is appended hereto and forms a part of this application.

In describing my invention in detail reference will be had to the accompanying drawings wherein like characters denote like or corresponding parts throughout the several views, and in which:

Figure 1 is a longitudinal sectional view of a stock fountain constructed in accordance with the invention here claimed; and Fig. 2 is a section on the line 2—2 of Fig. 1.

Before proceeding with a description of the drawings I desire to call particular attention to the fact that while I have evolved my invention with reference to its use as a fountain for watering live stock, the same, if desired, may be, by slight modification, utilized as a fountain for watering poultry.

Referring now to the drawings by numerals, 1 designates the fountain receptacle which, in its preferred embodiment, consists of a long low metallic trough like body having a low drinking space 2 at one end of the receptacle and a high float-chamber 3 at the opposite end thereof. Float-chamber 3 is provided with a removable top 4 that access may be gained to the cut-off device for purposes of repair.

The cut-off device, designated as an entirety by the numeral 5 may be said to consist of an exteriorly threaded inlet pipe extension 6, a valve chamber 7, a valve (not shown) a valve stem 8 and a hollow metallic float 9, the latter, float 9, having connection with the stem 8 that the water supplied to the tank or receptacle 1 may serve as a means whereby the valve (not shown) is opened and closed to automatically cut off the water supply. The extension 6 is adjustable vertically relatively to an enlargement 10 formed in the bottom of the receptacle 1 that the water level of the receptacle may be varied, if desired.

Pivoted as at 11 to the removable cover 4 is a suitable shield or protector 12, the mentioned shield or protector being of a construction or design adapted for securement between the sides of the receptacle.

In use, a water supply pipe (not shown) is attached to the supply pipe extension 6. The cut-off device 5 is then adjusted vertically relatively to the receptacle 1 until float 9 rests, as shown to advantage in Fig. 2 upon the floor of said receptacle. The float, in the position last mentioned, will so act upon valve stem 8 and the valve (not shown) that the water supply to the receptacle 1 will be turned on. The filling of the receptacle will cause float 9 to be elevated until the position indicated in Fig. 1 is assumed whereupon the stem 8 and the valve (not shown) will automatically cut off the water supply. As the water is withdrawn from the trough or receptacle, float 9 will fall or open the valve, and thus automatically replenish the water supply. The protector plate 12 when in a depending position serves to inclose the valve whereby to prevent interference with the action of said valve by the animals, said plate being movable upward to expose the valve for adjustment.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In a stock watering device, an elongated rectangular container open at the top and having its opposite longitudinal side walls extended upwardly at one end thereof and apertured at either end of said extension, a cover plate having opposite edges bent at right angles and in the same direction and apertured for support between the extensions, bolts entering the apertures of the cover plate and extensions, an automatic cut-off valve in the container beneath the cover plate, and a protector plate having opposite edges bent at right angles and in the same direction, apertures in one end of said bent portion for supporting the plates upon a pair of said bolts whereby the protector plate may be depended to cover the valve, or moved upwardly to expose the same for adjustment.

In testimony whereof I affix my signature in presence of two witnesses.

ADOLPH KRUGER.

Witnesses:
C. E. CALLAGHAN,
JANE E. JOHNSTONE.

Copies of this patent may be obtained for five cents each, by addressing the "Commissioner of Patents, Washington, D. C."